United States Patent [19]
Grochowski et al.

[11] Patent Number: 5,535,347
[45] Date of Patent: Jul. 9, 1996

[54] ROTATORS IN MACHINE INSTRUCTION LENGTH CALCULATION

[75] Inventors: Edward Grochowski, San Jose; Ahmad Zaidi, Santa Clara; James Lan, San Jose, all of Calif.

[73] Assignee: Intel Corporation, Santa Clara, Calif.

[21] Appl. No.: 335,305

[22] Filed: Nov. 7, 1994

Related U.S. Application Data

[63] Continuation of Ser. No. 831,825, Feb. 6, 1992, abandoned.

[51] Int. Cl.[6] ........................................... G06F 9/30
[52] U.S. Cl. ........................... 395/375; 364/DIG. 1; 364/DIG. 2; 364/231.8; 364/238; 364/239
[58] Field of Search ................ 364/DIG. 1, DIG. 2; 395/375, 800

[56] References Cited

U.S. PATENT DOCUMENTS

| | | | |
|---|---|---|---|
| 4,502,111 | 2/1985 | Riffe et al. | 395/775 |
| 4,858,105 | 8/1989 | Kuriyama et al. | 395/375 |
| 5,148,528 | 9/1992 | Fite et al. | 395/375 |
| 5,226,126 | 7/1993 | McFarland et al. | 395/375 |

*Primary Examiner*—Robert B. Harrell
*Attorney, Agent, or Firm*—Blakely, Sokoloff, Taylor & Zafman

[57] ABSTRACT

A circuit for determining the length of an instruction including apparatus for providing a sequence of instruction bytes greater than a single instruction length, rotator apparatus for selecting a sequential number of instruction bytes for decoding commencing at a byte which begins a first instruction, control apparatus for operating the rotator, and apparatus responsive to a decoded length value derived from the first instruction for causing the control apparatus to cause the rotator to rotate to the beginning of a next instruction.

31 Claims, 2 Drawing Sheets

| Prefix | Op Code | Mod R/M | SIB | Displacement | Immediate |
|--------|---------|---------|-----|--------------|-----------|
| 0 - 4  | 1       | 0,1     | 0,1 | 0, 1, 2, 4   | 0, 1, 2, 4 |

ROTATORS IN MACHINE INSTRUCTION LENGTH CALCULATION

This is a continuation of application Ser. No. 07/831,825, filed Feb. 6, 1992, now abandoned.

BACKGROUND OF THE INVENTION

1. Field of the Invention

This invention relates to computer processors and, more particularly, to methods and apparatus for rapidly determining the length of instructions being processed from a stream of sequential instructions of variable lengths which are not differentiated one from another.

2. History of the Prior Art

Computer designers are continually attempting to make computers run faster. One way in which this may be accomplished is to make the computer process instructions faster. Typically, a computer processor handles the instructions of any process in sequential order, one after another. Thus, instruction one must be processed or at least decoded before process two can start. For example, computers based on the microprocessors manufactured by Intel Corporation including the 8086, 8088, 80286, i386™, and the i486™ microprocessors (hereinafter referred to as the Intel microprocessors) operate in response to instructions which vary in length from one byte to fifteen bytes. These instructions are arranged in existing programs for the Intel microprocessors to be manipulated in typical sequential order.

One way in which the speed of computers is increased is by pipelining instructions. Instead of running through each instruction until it is complete and then commencing the next instruction, the stages of an instruction are overlapped so that no part of the computer lies idle while another stage is being accomplished. The computers based on the Intel microprocessors pipeline instructions so that each phase of the operation may be handled in one clock period. The phases or steps into which an instruction for an Intel microprocessor are divided include fetching the instruction from wherever it is stored, decoding the instruction, executing the instruction, and then writing the results of the execution to storage for later use. Each of the different steps is designed to require one clock period. Different portions of the computers accomplish each of the steps in the pipeline on sequential instructions during each clock period. Thus, during a first clock period the prefetch portion of the computer fetches an instruction from storage and aligns it so that is ready for decoding. During a second clock period the prefetch portion of the computer fetches the next instruction from storage and aligns it so that is ready for decoding in the third clock period. A decoder portion of the computer does the first stage of decoding of the first instruction fetched during the second clock period. The decoder portion of the computer does the first stage of decoding of the second instruction fetched during the third clock period. By pipelining instructions the overall speed of operation is significantly increased.

The instructions are available to be prefetched on the bus or from a cache memory as a stream of bytes in which no instruction is differentiated from any other. These instruction must be prefetched from these sources in one clock period. Thus, each instruction (in general) appears in order in any process. In order to determine the length of an instruction being prefetched for processing at any time, previous computers using the Intel microprocessors took a sufficient number of bytes to determine the type of instruction and its length and decoded the instruction to determine its content. When this has been accomplished, the length of the instruction being processed and the starting point for the next instruction in sequence are known and can be fed back to the prefetch unit. This has forced the decoding of instructions in all previous computers based on the Intel microprocessors to be conducted serially. This also makes the time used in determining the length of an instruction critical to the speed of operation of the computer.

To date the process for accomplishing this length determination has been able to keep up with the speed of the computers. However, new processors are being devised in which the present methods of instruction length determination are not fast enough. A computer can be made to process instructions faster if two or more instructions can be run simultaneously. This may be accomplished by providing more than one processing path or channel for the instructions handled by the computer and running the processing paths simultaneously whenever possible. A computer having a processor with two or more processing paths which are capable of simultaneously processing general machine instructions which are normally run serially is called a super scaler computer.

If any new computer is to be commercially successful, it must have a base of application programs which it can run when it is introduced in order to be of interest to users. The most economic way to provide such programs is to design the new computer to operate the application programs designed for an earlier computer or family of computers.

In order to provide a super scaler computer which is able to function with software used by older computers using the Intel microprocessors, the new machine must be able to understand and process the instructions of that software. Since the instructions used in the for the Intel microprocessors vary in length from one byte to fifteen bytes and are arranged in existing programs to be manipulated in sequential order as a stream of bytes in which no instruction is differentiated from any other, the determination of the length of instructions has become more critical. The prior art method of first decoding an instruction to determine its length in order to determine the starting point for the next instruction in sequence is not fast enough.

Since a super scaler machine must process at least two instructions simultaneously, it must decode two instructions simultaneously. However, to select the correct starting point for a second instruction, it must know where a first instruction ends so that it may know where the next (second) instruction begins. Yet only by decoding the first instruction can it know the length of the first instruction and, thus, where the second instruction begins. The entire purpose of the super scaler to process two instructions at the same time is defeated if the processing of the second instruction must await the decoding of the first instruction before it can begin.

An arrangement used in the prefetch operation for determining the ends of individual instructions in a stream of instructions without decoding the instruction in the decode circuitry is described in U.S. patent application Ser. No. 07/831,942, now abandoned, entitled End Bit Markers, E. Grochowski et al, filed on even date herewith, and assigned to the assignee of the present invention. One of the problems encountered in designing the arrangement of this patent application was to provide an arrangement for deriving from the stream of instruction data available a sufficient amount of data to include the two sequential instructions which are to be processed by the two channels of the super scaler processor while maintaining the speed of the operation of the computer. Such an arrangement is described in U.S. patent application Ser. No. 07/831,968, now abandoned, entitled Two Stage Window Multiplexors For Deriving Variable Length Instructions From A Stream Of Instructions, E. Grochowski, filed on even date herewith, and assigned to the assignee of the present invention.

In order for the arrangements described in each of the above-mentioned patent applications to function correctly, and even though the instructions need not be decoded to determine an instruction length to derive a starting point for each next instruction, the length of each instruction must still be determined. Moreover, the length of instructions processed must be determined in one clock period in order for the super scaler machine to perform correctly in maintaining the operation of a pair of pipelines. However, the typical method of determining the length of an instructions uses a plurality of adders in a chain with a carry generation operation. Such an operation cannot be carried out within the clock period provided.

SUMMARY OF THE INVENTION

It is, therefore, an object of the present invention to speed the computation of the length of an instruction in a computer system using varied length instructions.

It is another more specific object of the present invention to provide an arrangement for rapidly computing the total lengths of a plurality of multipart instructions and the combined length of those instructions without the use of the typical adder arrangements.

These and other objects of the present invention are realized in a circuit for determining the length of an instruction comprising means for providing a sequence of instruction bytes greater than a single instruction length, rotator means for selecting a sequential number of instruction bytes for decoding commencing at a byte which begins a first instruction, control means for operating the rotator, and means responsive to a decoded length value derived from the first instruction for causing the control means to cause the rotator to rotate to the beginning of a next instruction.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to apparatus for operating a computer in processing electrical or other (e.g. mechanical, chemical) physical signals to generate other desired physical signals.

DETAILED DESCRIPTION OF THE INVENTION

Figures 1, 2:
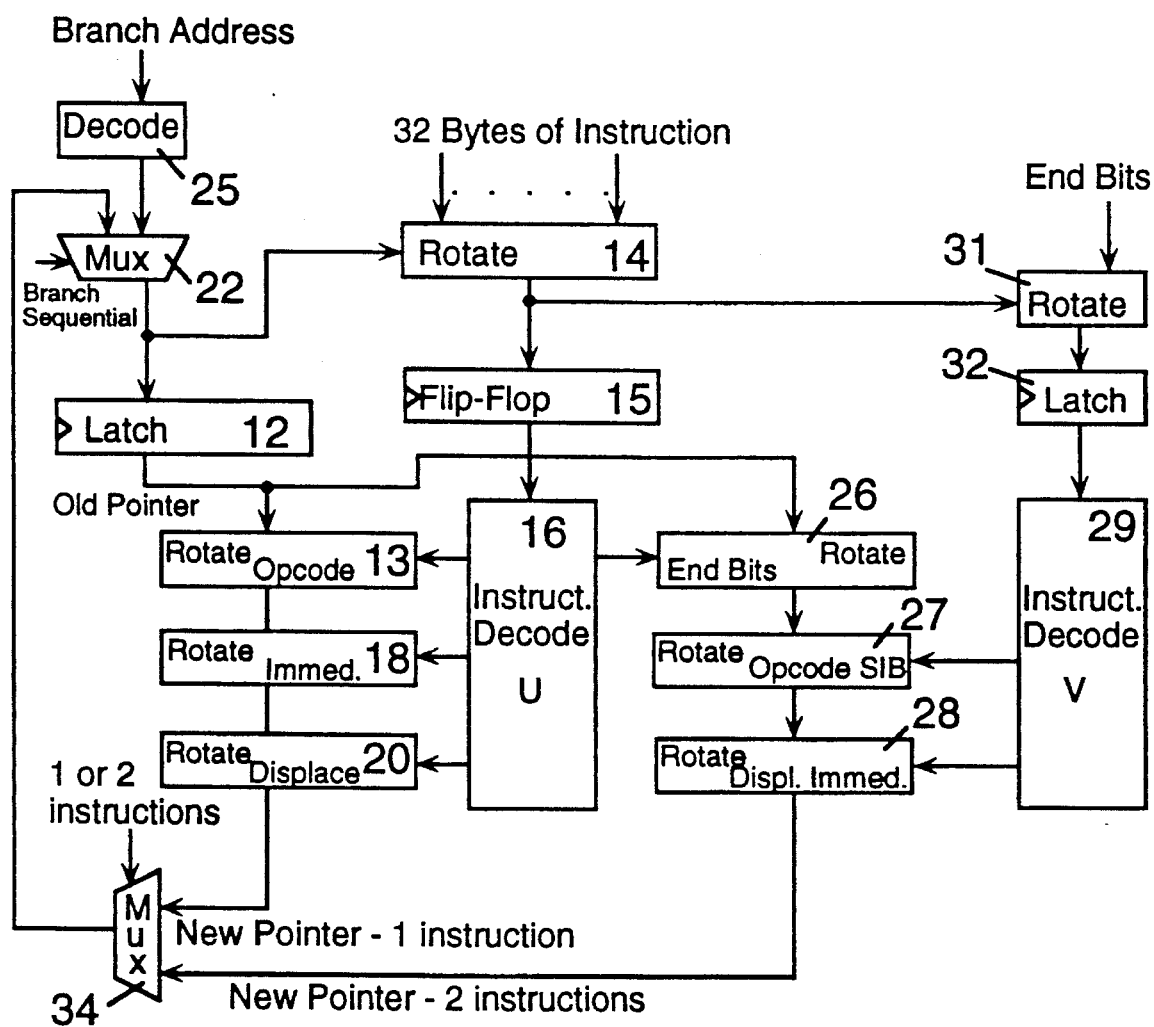
FIG. 1 is a diagram illustrating the possible fields of instructions used with the Intel microprocessors.
FIG. 2 is a block diagram of a circuit constructed in accordance with the present invention.

FIG. 1 illustrates the components of instructions used with the Intel microprocessors. As may be seen, an instruction may consist of several fields. The number of fields may include from zero to four bytes of prefix information, one or two bytes of opcode, zero or one byte of ModR/M information, zero or one byte of SIB information, from zero to four bytes of displacement information, and from zero to four bytes of immediate information. All of the fields other than the opcode are optional. The maximum length of any instruction is fifteen bytes. The minimum length is one byte of opcode. The details of the individual elements of instructions are described in i486 *Microprocessor, Programmer's Reference Manual*, published by Osborne McGraw-Hill, 1990, pp. 26-1 et seq. Pertinent to this discussion is the fact that the presence of the ModR/M byte is known from the opcode byte, and the presence of the SIB byte is known from the ModR/M byte. Consequently, the length of these three elements of an instruction may be determined together as the instruction is decoded. Moreover, the prefix bytes are handled by the decode unit separately, and each byte of prefix requires one clock period to decode. These prefix bytes, if they exist and they are rare, slow the operation of the decode unit and cause it to step the pointer value by one bit at a time to move the instruction rotator one byte at a time until other than a prefix byte is encountered; consequently, the decoding of prefix bytes is not attempted simultaneously with the execution of other instructions and the decoding of the prefix bytes is not a portion of this invention. Other details relating to an instruction, other than the length of the individual portions of an instruction, are not important to this specification and are not included for that reason.

The instructions used by the Intel microprocessors are available to the prefetch circuitry of the processor in serial order without a means to differentiate one from another except by decoding the instructions. Since the instructions may be of a variety of lengths, the computers based on the Intel microprocessors have been required to decode each instruction and determine its length before the beginning of the next instruction could be determined. So long as instructions are used one at a time and the clock frequency remains low enough, this has been possible. However, as clock frequencies have increased, it has become more difficult.

With the advent of super scaler machines in which two instructions may be processed simultaneously, the time required to determine the length of an instruction has become critical.

The typical method for accomplishing the length determination in prior art machines has been to determine the length of each portion of the new instruction (apart from the prefix bytes) and add those lengths and the pointer to the last instruction using typical carry propagate adders. This provides a new pointer value. This new value may be decoded and used to operate multiplexors to transfer a sufficient amount of instruction data to provide the instruction length beginning at the correct byte position in the stream of instructions. The time for the addition of the components of the length using this method is delayed because of the necessity of waiting for carry bits to propagate through the chain of conventional adders. It has been found that with clock frequencies of fifty megahertz and over and a requirement to add the lengths of at least two instructions to an existing pointer value, the operation cannot be accomplished within the desired time.

Referring now to FIG. 2 there is shown a block diagram of a circuit 10 constructed in accordance with the present invention. The circuit 10 overcomes the deficiencies of the prior art method of determining instruction length and thus accelerates the operation of computer processors. Instead of utilizing a typical adder with its delayed carry propagation, the circuit 10 utilizes a series of rotators to accomplish the addition without the delay incurred by the carry propagate operation.

The circuit 10 to accomplish this takes the old prefetch instruction pointer value from a latch circuit 12 in which that value is held to control the selection of the present instruction from a sequence of instructions. The pointer value is furnished as a thirty-two bit value to a first rotator circuit 13. The value held in the latch 12 is not the typical coded value; but rather it is a bit vector which is thirty-two bits long with a single one of those thirty-two bits set to indicate a byte position. This byte position indicates the first byte in the instruction the length of which is being measured. The instruction is furnished by a rotator 14 in response to the pointer value. The rotator 14 uses this value to furnish from the instruction stream fourteen bytes of instruction data aligned at the beginning byte of the first of two instructions being processed. The details of the circuitry by which the instruction is furnished by the rotator 14 are described in the patent application, referred to above, entitled Two Stage Window Multiplexors For Deriving Variable Length Instructions From A Stream Of Instructions.

The instruction data is transferred by the rotator 14 to a flip-flop 15 used in the circuit 10 to provide an appropriate timing delay. The instruction data is then transferred to a decoder 16 which begins the translation of the information contained in the instruction. The decoder circuit 16 includes a number of programmed logic arrays which look at the various elements of the fields of the instruction and provide useful data. The method by which this is accomplished is not the subject of this patent and therefore is not detailed here. U.S. patent application Ser. No. 07/823,881, now abandoned entitled Microprocessor With Apparatus for Parallel Execution of Instructions, E. Grochowski, filed Jan. 23, 1992, and assigned to the assignee of the present invention describes in detail the circuitry and operation of the decoder circuits with which the preferred embodiment of the present invention cooperates.

One of the elements of data provided by the decoding is the length of the opcode, ModR/M, and SIB portions of the instruction. As pointed out above, the determination of the opcode will tell whether a ModR/M byte of instruction exists; and certain bits of the ModR/M byte (if it exists) will tell whether a SIB byte exists. Thus, the length of these three elements of the instruction are determined together and furnished to the rotator 13 as a control signal which may be used to rotate the value in the rotator 13 by one, two, or three bit positions. The rotator 13 is constructed in a well known manner and is essentially a barrel shifter capable of shifting around the end; thus when the single bit which is set moves to the highest bit position, the next shift wraps the set bit to first lowest position. The control signal thus moves the position of the single bit which is set in the old prefetch pointer by the appropriate number of bits indicating the length determined for that portion of the instruction by the decoder circuit 16. This rotating of the bit which is set, in effect, adds the length of the opcode instruction bits to the old pointer value. The bit which is set by the rotator 13 moves the appropriate number of bits and the other bits transferred by the rotator 13 are zeroes so that the new value furnished at the output of the rotator 13 indicates the length of the instruction being processed if only the opcode and its associated fields exist. Thus, if the length measured for these instruction bytes is two bytes, the bit is rotated left by two bits.

Figure 3:
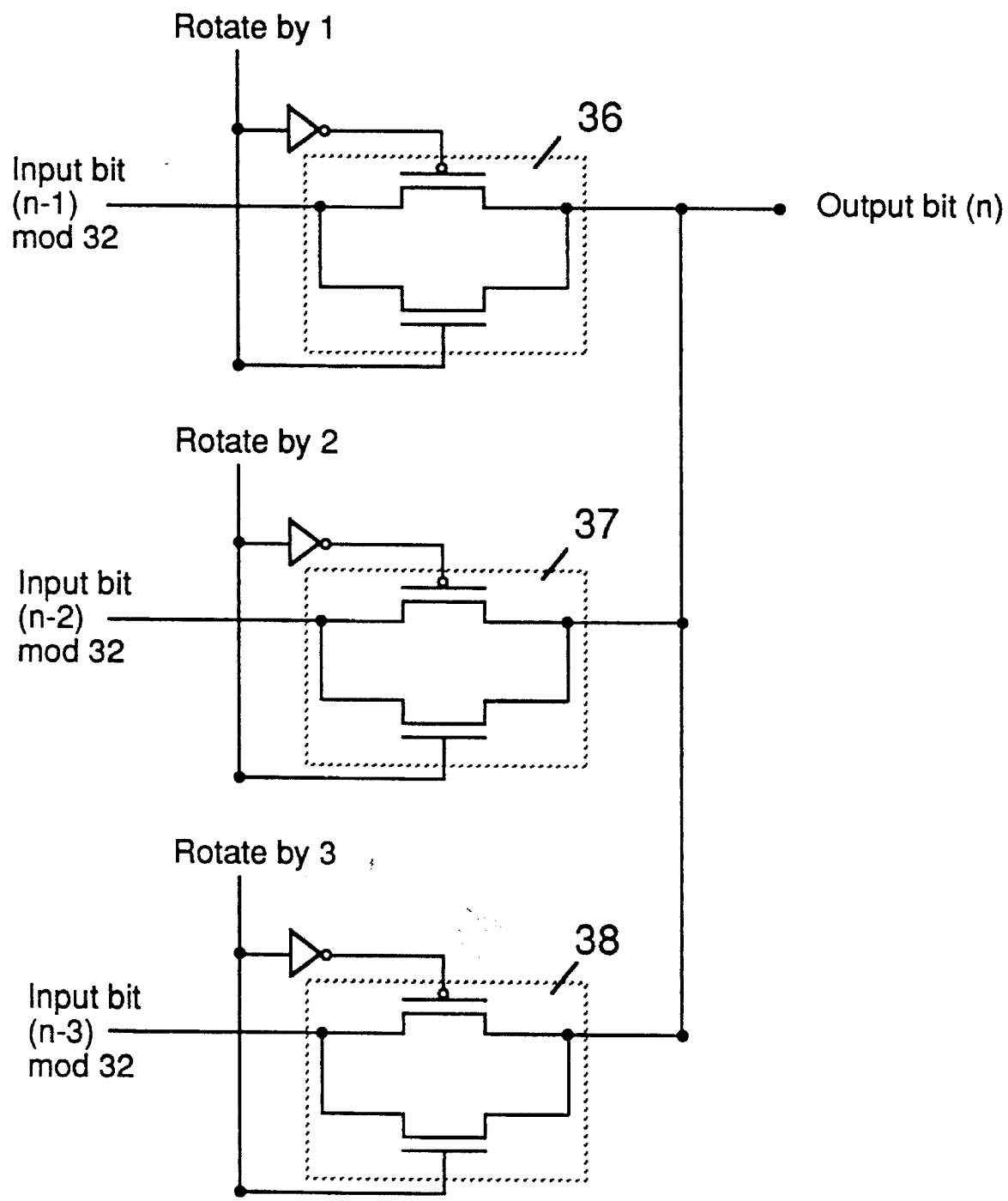
FIG. 3 is a block diagram of a circuit constructed in accordance with the present invention for implementing the rotators illustrated in FIG. 2.

FIG. 3 illustrates circuitry 35 for implementing a single bit position n of a 32 bit rotator 13 and similar rotators described hereinafter. The circuitry 35 includes a first transmission gate 36, a second transmission gate 37, and a third transmission gate 38. Each transmission gate is comprised of an N channel MOS device and a P channel MOS device with their source and drain terminals connected together so that the devices transfer the input signal to the output terminals when they are active. The transmission gate 36 receives input indicating the condition of bit position n-1. The transmission gate 36 receives an enabling signal indicating rotation by one bit position from the decoder circuit 16 so that it transfers to its output the value held in bit position n-1 if rotation by one is indicated. Similarly, the transmission gate 37 receives an input signal indicating the condition of the bit at position n-2 and an enabling signal from the decoder circuit 16 if rotation by two bit positions is indicated. Thus, the transmission gate 37 transfers to the output terminal the condition of the bit at position n-2 if rotation is by two bit positions. The transmission gate 38 receives the value at bit position n-3 and an enabling input if the decoder circuit 16 indicates rotation by three bit positions. Thus, the circuitry 35 produces a bit at its output terminal from the n-1, n-2, or n-3 bits when rotation is indicated by the decoder circuit 16 to be, respectively, one, two, or three bits.

Similarly, the decoder 16 translates and determines the length of any immediate fields of the instruction. This determination furnishes a value of zero, one, two, or four to another rotator 18. The rotator 18 receives the output of the rotator 13 with the single bit for the pointer set at the appropriate position to add in the length of the opcode fields. The rotator 18 is similar to the rotator 13 except that it contains circuitry for rotating each bit position by zero, one, two, or four bit positions. Thus, the rotator 18 further rotates the bit which is set to the appropriate bit position to add the length of the immediate fields to the length of the instructions.

Similarly, the decoder 16 translates and determines the length of any displacement fields of the instruction. This determination furnishes a value of zero, one, two, or four to another similar rotator 20. The rotator 20 receives the output of the rotator 18 with the one for the pointer set at the appropriate position to add in the lengths of the opcode and the immediate fields of the instruction being decoded. The rotator 20 rotates the bit which is set to the appropriate bit position to include the length of the displacement fields of the instructions. In consequence, a bit vector is furnished at the output of the rotator 20 which is all zeroes except for a single bit set to a one. This single bit indicates the position at which the next instruction commences in a sequence of thirty-two bytes of instruction data. Thus, this value may be fed back via a multiplexor 22 to directly control the operation of the rotator 14.

It is especially useful that the value furnished be a thirty-two bit value because this value may, without any decoding, directly control the transfer by the rotator 14. In a more conventional circuit, a five bit coded pointer value would be decoded into a thirty-two bit value to control the thirty-two gates of the 32-to-1 rotator 14. This decoding operation takes both time and extra circuitry. The present invention allows the value produced at the output of the rotator 20 to be transferred directly to the gates of the rotator 14 to control those gates so that the appropriate byte values of the next instruction are selected without any decoding.

Of course, it will be recognized by those skilled in the art that a pointer value will still have to be decoded in instances in which a branch instruction is processed. Such a decode circuit 25 is illustrated in FIG. 2. The decoded pointer is transferred by the multiplexor 22 in response to a branch selection to control the operation of the 32-to-1 rotator 14 which selects the particular bytes of instruction data to be utilized by the processor.

It will also be recognized that the determination of instruction length values when used in a super scaler computer requires that an individual set of rotators be used for each of the processing channels to obtain a length value for each of the instructions being simultaneously processed. These values may then be added by a separate rotator to provide a pointer value to be transferred for controlling the rotator 14. The separate set of rotators for a second channel is illustrated in FIG. 2 as rotators 26, 27, and 28. The old pointer value is furnished from the latch 12 to the rotator 26 where it is rotated by the number of bit positions equal to the length of the first instruction. This value may be determined from the end bit marker referred to above in the copending patent application. Thus, the bit which is set in the rotator 26 will be the bit indicating the beginning of the second instruction, the instruction to be furnished to the V channel.

This instruction is derived by transferring a sufficient number of the thirty-two bytes of instruction data furnished by the rotator 14 to a rotator 31. In order to provide a correct byte value for the instruction to be transferred to the second channel, the rotator 31 receives the bytes of the two instructions being processed and rotates those bytes an amount equivalent to the length of the first instruction as indicated by the end bit marker referred to above. The details of the operation of two channels to select the beginnings of two sequential instructions are described in the first abovementioned U.S. patent application entitled End Bit Markers.

The instruction is transferred to a latch 32 and then to the V channel instruction decode circuit 29. The decoding of the opcode portion of the V channel instruction is used to further rotate the one bit which is set of the thirty-two bits in the rotator 27 provided as output by the rotator 26. The output of the rotator 27 is rotated an additional number of bit positions depending on the further decoding of the instruction being processed in the V channel. This additional number will be equal to the length of any immediate portion of the instruction or any displacement portion of the instruction, but not both because both will not exist in the particular arrangement for which this invention was planned.

Ultimately, a value is produced by the rotator 28 which has a single bit set at a position which is equal to the combined lengths of the two instructions being simultaneously processed by the U and V channels. The multiplexor 34 then selects whether one or two instructions are being processed and sends the appropriate thirty-two bit value with a single bit set to control the decoding of the next instructions to be processed.

Thus, rather than utilize a typical adder arrangement to add up the various length values included within one or two instructions, a shifting process using the rotators described is utilized. This process is not only faster in accomplishing a result but has the added advantage of producing a result which can immediately be used to manipulate the gates by which instruction selection is accomplished without the need to decode a binary value as in prior art arrangements.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A superscalar processor, comprising:

first channel rotator that stores a set of instruction bytes of a set of variable length instructions;

register that stores a bit vector having a set of bits corresponding to the instruction bytes in the first channel rotator such that only one of the bits in the bit vector indicates which one of the instruction bytes corresponds to a starting byte of a first variable length instruction of the variable length instructions;

first channel decoder that decodes a set of fields of the first variable length instruction and that generates a length specified by the fields;

first channel rotator circuitry that generates a first updated bit vector by shifting the bit vector according to the length generated by the first channel decoder such that the first updated bit vector indicates which one of the instruction bytes in the first channel rotator corresponds to a starting byte of a second variable length instruction of the variable length instructions;

second channel rotator that receives the instruction bytes from the first channel rotator and that aligns the second variable length instruction of the variable length instructions by shifting instruction bytes according to a set of end bits generated by the first channel decoder wherein the end bits indicate the length of the first variable length instruction;

second channel decoder that decodes a set of fields of the second variable length instruction and that generates a length specified by the fields of the second variable length instruction;

second channel rotator circuitry that generates a second updated bit vector by shifting the first updated bit vector according to the length generated by the second channel decoder such that the second updated bit vector indicates which one of the instruction bytes in the first channel rotator corresponds to a starting byte of a next variable length instruction of the variable length instructions.

2. The superscalar processor of claim 1, wherein the first channel rotator circuitry comprises a rotator that shifts the bit vector according to a length indicated by an opcode field of the fields of the first variable length instruction.

3. The superscalar processor of claim 1, wherein the first channel rotator circuitry comprises a rotator that shifts the bit vector according to a length indicated by an immediate field of the fields of the first variable length instruction wherein the immediate field indicates a number of bytes of immediate data contained in the first variable length instruction.

4. The superscalar processor of claim 1, wherein the first channel rotator circuitry comprises a rotator that shifts the bit vector according to a length indicated by a displacement field of the fields of the first variable length instruction wherein the displacement field indicates a number of bytes of displacement fields contained in the first variable length instruction.

5. The superscalar processor of claim 1, wherein the second channel rotator circuitry comprises a rotator that shifts the first updated bit vector according to a length indicated by an opcode field of the fields of the second variable length instruction.

6. The superscalar processor of claim 1, wherein the second channel rotator circuitry comprises a rotator that shifts the first updated bit vector according to a length indicated by an immediate field of the fields of the second variable length instruction wherein the immediate field of the second variable length instruction indicates a number of bytes of immediate data contained in the second variable length instruction.

7. The superscalar processor of claim 1, wherein the second channel rotator circuitry comprises a rotator that shifts the first updated bit vector according to a length indicated by a displacement field of the fields of the second variable length instruction wherein the displacement field of the second variable length instruction indicates a number of bytes of displacement fields contained in the second variable length instruction.

8. A circuit for aligning a set of variable length instructions, comprising:

first channel rotator that stores the variable length instructions as a set of instruction bytes and that receives a bit vector having a set of bits corresponding to the instruction bytes such that only one of the bits in the bit vector indicates which one of the instruction bytes corresponds to a starting byte of a first variable length instruction of the variable length instructions;

first channel decoder that decodes a set of fields of the first variable length instruction and that generates a length specified by the fields;

first channel rotator circuitry that generates a first updated bit vector by shifting the bit vector according to the length generated by the first channel decoder such that the first updated bit vector indicates which one of the instruction bytes in the first channel rotator corresponds to a starting byte of a second variable length instruction of the variable length instructions.

9. The circuit of claim 8, further comprising:

second channel rotator that receives the instruction bytes from the first channel rotator and that aligns the second variable length instruction of the variable length instructions by shifting instruction bytes according to a set of end bits generated by the first channel decoder wherein the end bits indicate the length of the first variable length instruction;

second channel decoder that decodes a set of fields of the second variable length instruction and that generates a length specified by the fields of the second variable length instruction;

second channel rotator circuitry that generates a second updated bit vector by shifting the first updated bit vector according to the length generated by the second channel decoder such that the second updated bit vector indicates which one of the instruction bytes in the first channel rotator corresponds to a starting byte of a next variable length instruction of the variable length instructions.

10. The circuit of claim 9, wherein the second channel rotator circuitry comprises a rotator that shifts the first updated bit vector according to a length indicated by an opcode field of the fields of the second variable length instruction.

11. The circuit of claim 9, wherein the second channel rotator circuitry comprises a rotator that shifts the first updated bit vector according to a length indicated by an immediate field of the fields of the second variable length instruction wherein the immediate field of the second variable length instruction indicates a number of bytes of immediate data contained in the second variable length instruction.

12. The circuit of claim 8, wherein the second channel rotator circuitry comprises a rotator that shifts the first updated bit vector according to a length indicated by a displacement field of the fields of the second variable length instruction wherein the displacement field of the second variable length instruction indicates a number of bytes of displacement fields contained in the second variable length instruction.

13. The circuit of claim 8, wherein the first channel rotator circuitry comprises a rotator that shifts the bit vector according to a length indicated by an opcode field of the fields of the first variable length instruction.

14. The circuit of claim 8, wherein the first channel rotator circuitry comprises a rotator that shifts the bit vector according to a length indicated by an immediate field of the fields of the first variable length instruction wherein the immediate field indicates a number of bytes of immediate data contained in the first variable length instruction.

15. The circuit of claim 8, wherein the first channel rotator circuitry comprises a rotator that shifts the bit vector according to a length indicated by a displacement field of the fields of the first variable length instruction wherein the displacement field indicates a number of bytes of displacement fields contained in the first variable length instruction.

16. A method for aligning a set of variable length instructions, comprising the steps of:

generating a bit vector having a set of bits that correspond to a set of instruction bytes of the variable length instructions such that only one of the bits in the bit vector indicates which one of the instruction bytes corresponds to a starting byte of a first variable length instruction of the variable length instructions;

determining a length specified by a set of fields of the first variable length instruction by decoding the fields;

generating a first updated bit vector by shifting the bit vector according to the length specified by the fields such that the first updated bit vector indicates which one of the instruction bytes corresponds to a starting byte of a second variable length instruction of the variable length instructions.

17. The method of claim 16, further comprising the steps of:

aligning the second variable length instruction of the variable length instructions by shifting instruction bytes according to a set of end bits wherein the end bits indicate the length of the first variable length instruction;

generating a length specified by a set of fields of the second variable length instruction by decoding the fields;

generating a second updated bit vector by shifting the first updated bit vector according to the length generated by the second channel decoder such that the second updated bit vector indicates which one of the instruction bytes corresponds to a starting byte of a next variable length instruction of the variable length instructions.

18. The method of claim 17, wherein the step of generating a second updated bit vector comprises the step of shifting the first updated bit vector according to a length indicated by an opcode field of the fields of the second variable length instruction.

19. The method of claim 17, wherein the step of generating a second updated bit vector comprises the step of shifting the first updated bit vector according to a length indicated by an immediate field of the fields of the second variable length instruction wherein the immediate field of the second variable length instruction indicates a number of bytes of immediate data contained in the second variable length instruction.

20. The method of claim 17, wherein the step of generating a second updated bit vector comprises the step of shifting the first updated bit vector according to a length indicated by a displacement field of the fields of the second variable length instruction wherein the displacement field of the second variable length instruction indicates a number of bytes of displacement fields contained in the second variable length instruction.

21. The method of claim 16, wherein the step of generating a first updated bit vector comprises the step of shifting the bit vector according to a length indicated by an opcode field of the fields of the first variable length instruction.

22. The method of claim 16, wherein the step of generating a first updated bit vector comprises the step of shifting the bit vector according to a length indicated by an immediate field of the fields of the first variable length instruction wherein the immediate field indicates a number of bytes of immediate data contained in the first variable length instruction.

23. The method of claim 16, wherein the step of generating a first updated bit vector comprises the step of shifting the bit vector according to a length indicated by a displacement field of the fields of the first variable length instruction wherein the displacement field indicates a number of bytes of displacement fields contained in the first variable length instruction.

24. An apparatus for aligning a set of variable length instructions, comprising:

means for generating a bit vector having a set of bits that correspond to a set of instruction bytes of the variable length instructions such that only one of the bits in the bit vector indicates which one of the instruction bytes corresponds to a starting byte of a first variable length instruction of the variable length instructions;

means for determining a length specified by a set of fields of the first variable length instruction by decoding the fields;

means for generating a first updated bit vector by shifting the bit vector according to the length specified by the fields such that the first updated bit vector indicates which one of the instruction bytes corresponds to a starting byte of a second variable length instruction of the variable length instructions.

25. The apparatus of claim 24, further comprising:

means for aligning the second variable length instruction of the variable length instructions by shifting instruction bytes according to a set of end bits wherein the end bits indicate the length of the first variable length instruction;

means for generating a length specified by a set of fields of the second variable length instruction by decoding the fields;

means for generating a second updated bit vector by shifting the first updated bit vector according to the length generated by the second channel decoder such that the second updated bit vector indicates which one of the instruction bytes corresponds to a starting byte of a next variable length instruction of the variable length instructions.

26. The apparatus of claim 25, wherein the means for generating a second updated bit vector comprises means for shifting the first updated bit vector according to a length indicated by an opcode field of the fields of the second variable length instruction.

27. The apparatus of claim 25, wherein the means for generating a second updated bit vector comprises means for shifting the first updated bit vector according to a length indicated by an immediate field of the fields of the second variable length instruction wherein the immediate field of the second variable length instruction indicates a number of bytes of immediate data contained in the second variable length instruction.

28. The apparatus of claim 25, wherein the means for generating a second updated bit vector comprises means for shifting the first updated bit vector according to a length indicated by a displacement field of the fields of the second variable length instruction wherein the displacement field of the second variable length instruction indicates a number of bytes of displacement fields contained in the second variable length instruction.

29. The apparatus of claim 24, wherein the means for generating a first updated bit vector comprises means for shifting the bit vector according to a length indicated by an opcode field of the fields of the first variable length instruction.

30. The apparatus of claim 24, wherein the means for generating a first updated bit vector comprises means for shifting the bit vector according to a length indicated by an immediate field of the fields of the first variable length instruction wherein the immediate field indicates a number of bytes of immediate data contained in the first variable length instruction.

31. The apparatus of claim 24, wherein the means for generating a first updated bit vector comprises means for shifting the bit vector according to a length indicated by a displacement field of the fields of the first variable length instruction wherein the displacement field indicates a number of bytes of displacement fields contained in the first variable length instruction.

* * * * *

UNITED STATES PATENT AND TRADEMARK OFFICE
CERTIFICATE OF CORRECTION

PATENT NO. : 5,535,347
DATED : July 9, 1996
INVENTOR(S) : Grochowski et al.

It is certified that error appears in the above-identified patent and that said Letters Patent is hereby corrected as shown below:

In column 2 at line 34 delete "the for the"

Signed and Sealed this

Fifteenth Day of July, 1997

Attest:

BRUCE LEHMAN

Attesting Officer

Commissioner of Patents and Trademarks